United States Patent
Weiss et al.

(10) Patent No.: US 8,232,894 B2
(45) Date of Patent: *Jul. 31, 2012

(54) MOBILE SYSTEM FOR EXACTING PARKING TOLLS

(75) Inventors: Stanley B. Weiss, Rhinebeck, NY (US); Michael Kolb, Elizabeth, NJ (US)

(73) Assignee: Traffic Technologies, Inc., New Windsor, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/239,970

(22) Filed: Sep. 22, 2011

(65) Prior Publication Data
US 2012/0036074 A1 Feb. 9, 2012

Related U.S. Application Data

(63) Continuation of application No. 12/198,806, filed on Aug. 26, 2008, now Pat. No. 8,026,832.

(60) Provisional application No. 60/968,278, filed on Aug. 27, 2007.

(51) Int. Cl.
*B60Q 1/48* (2006.01)
(52) U.S. Cl. ..................... 340/932.2; 340/928
(58) Field of Classification Search .................. 340/928, 340/932.2
See application file for complete search history.

(56) References Cited

U.S. PATENT DOCUMENTS

| | | |
|---|---|---|
| 4,870,419 A | 9/1989 | Baldwin et al. |
| 5,414,624 A | 5/1995 | Anthonyson |
| 5,737,710 A | 4/1998 | Anthonyson |
| 6,191,705 B1 | 2/2001 | Oomen et al. |
| RE37,822 E * | 8/2002 | Anthonyson ....................... 701/1 |
| 6,559,776 B2 * | 5/2003 | Katz ........................... 340/932.2 |
| D486,850 S | 2/2004 | Griffith |
| RE38,626 E * | 10/2004 | Kielland ....................... 340/937 |
| 6,832,206 B1 * | 12/2004 | Chelnik ......................... 705/13 |
| 7,016,311 B2 | 3/2006 | Tiernay et al. |
| 7,161,476 B2 | 1/2007 | Hardman et al. |
| 7,825,826 B2 * | 11/2010 | Welch ......................... 340/932.2 |
| 8,026,832 B2 * | 9/2011 | Weiss et al. ................... 340/932.2 |
| 2001/0050922 A1 | 12/2001 | Tiernay et al. |

(Continued)

FOREIGN PATENT DOCUMENTS
EP 1811444 7/2007
(Continued)

OTHER PUBLICATIONS

Wappenhans, Patrick, "Electronic Payment Systems in Ferries and Car Parkings," 6th European Congress and Exhibition on ITS, Jun. 19, 2007 Denmark, Alborg.

*Primary Examiner* — Travis Hunnings
(74) *Attorney, Agent, or Firm* — Knobbe Martens Olson & Bear LLP

(57) ABSTRACT

Mobile systems are provided for charging electronic toll collection accounts for parking fees. The systems are configured to wirelessly request and receive tag data from an electronic toll device. Some embodiments include a vehicle and a boom, some embodiments include a handheld device, and other embodiments include combinations thereof. Methods of charging an electronic toll payment system are also provided. A mobile scan system wirelessly requests and receives tag data from an electronic toll device on a customer's vehicle which is checked for validity, and then an electronic toll collection account is charged a fee for parking.

26 Claims, 2 Drawing Sheets

U.S. PATENT DOCUMENTS

| | | | |
|---|---|---|---|
| 2004/0227616 A1* | 11/2004 | Lafferty | 340/5.61 |
| 2005/0234778 A1 | 10/2005 | Sperduti et al. | |
| 2006/0219776 A1 | 10/2006 | Finn | |
| 2006/0255968 A1 | 11/2006 | Woo et al. | |

FOREIGN PATENT DOCUMENTS

| | | |
|---|---|---|
| WO | WO 98/49654 | 11/1998 |
| WO | WO 03/95276 | 11/2003 |
| WO | WO 2007/059192 | 5/2007 |

* cited by examiner

MOBILE SYSTEM FOR EXACTING PARKING TOLLS

CROSS-REFERENCE TO RELATED APPLICATIONS

This application is a continuation of U.S. application Ser. No. 12/198,806, filed Aug. 26, 2008, which claims the benefit of U.S. Provisional Application No. 60/968,278, filed on Aug. 27, 2007. The entire contents of each of these prior applications are hereby incorporated by reference and should be considered a part of this specification.

FIELD OF THE INVENTION

The invention relates generally to mobile systems for charging for parking using wireless communications.

BACKGROUND AND SUMMARY OF THE INVENTION

Radio frequency (RF) enabled electronic toll collection (ETC) systems carry out toll transactions between vehicles with a transponder, or a "tag," and a stationary transceiver, "a reader." An example of ETC is FasTrak™, which collects tolls for a variety of applications including crossing bridges in the San Francisco Bay Area, and similar systems are in place for use at bridges and toll roads throughout the country. A reader transmits an RF signal to a broadcast zone. When a vehicle equipped with a tag passes through the broadcast zone, the reader communicates with the tag. The tag sends data stored in memory, such as an identification (ID) number linked to an ETC account, to the reader. This enables an ETC system to conduct the toll transaction after checking that the tag is valid and that a proper toll can be collected.

ETC systems often require significant infrastructure to support their application. For example, local computer systems and tag readers needed to support ETC can be large and expensive. In addition, many ETC systems are unused a significant percentage of the time.

Accordingly, a mobilized ETC system that can easily be moved from location to location provides significant advantages. One particular application is to parking fee collection systems. A mobilized ETC system could be used at events such as concerts, sporting events, state fairs, or other places where attendants generally collect fees manually. This would improve traffic flow during peak times, offer customers the convenience of using ETC toll accounts, and enable greater utilization of the ETC system.

According to an embodiment, an electronic scan apparatus is provided. The electronic scan apparatus includes a mobile system configured to wirelessly request and receive tag data from an electronic toll device in order to collect payment for parking a vehicle. The mobile system includes a wireless reader capable of wirelessly communicating with a tag associated with a vehicle and a computer equipped with a database for verifying valid tag identification information. In one arrangement, the mobile system includes a handheld reader. In another arrangement, the mobile system includes a reader mounted to a boom that extends from a wheeled vehicle.

According to another embodiment, an electronic toll collection system is provided. The electronic toll collection system includes a toll collection vehicle and a boom. The boom is attached to the toll collection vehicle and is configured to extend from the vehicle over a lane. The boom includes a reader configured to wirelessly communicate with a tag associated with an electronic toll collection (ETC) account. The electronic toll collecting system also includes a computer in communication with the reader, the computer configured to verify valid tag data read by the reader and to provide an indication of the same.

According to yet another embodiment, a method of charging an electronic toll payment system is provided. A mobile scan system, including a reader and a computer, wirelessly requests and receives tag data from an electronic toll device on a vehicle at an entrance or exit to a parking venue. The computer compares tag data to a list of valid tags. Transaction data is created when the tag is included on the list of valid tags. Then, the transaction data is transmitted to charge an account associated with the toll device in order to collect a parking fee.

DETAILED DESCRIPTION OF CERTAIN EMBODIMENTS

Figure 1:
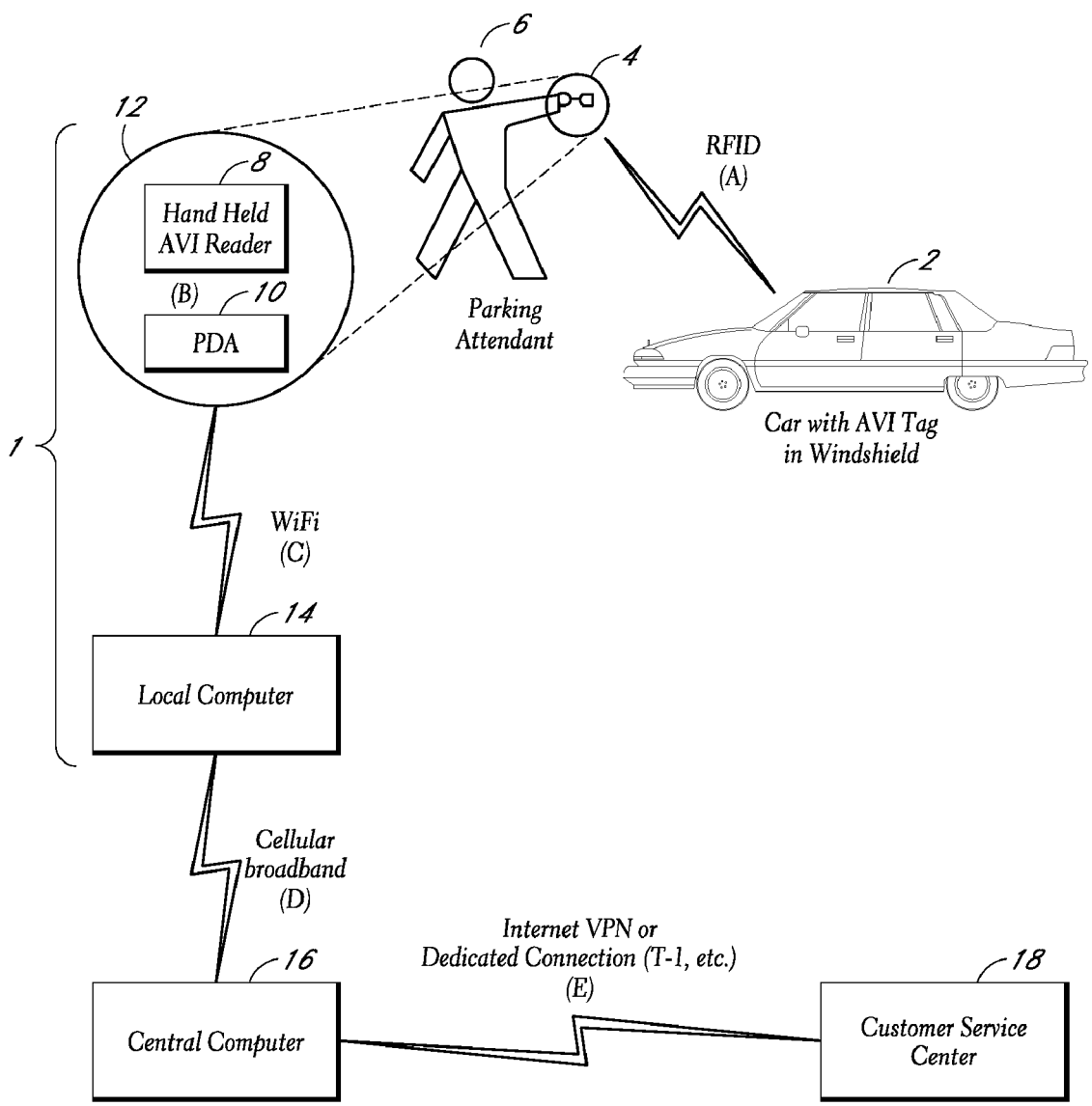
FIG. 1 illustrates one embodiment of a mobile system for collecting payment using a handheld tag or transponder reader.

Customer Service Centers (CSC) issue ETC accounts and record account balances. An example of such a CSC is a bridge management authority or a toll road management authority. An ETC account can be used at a variety of different toll facilities. A CSC periodically maintains a list of valid tags with positive ETC account balances to participating toll facilities. An ETC account can be established at a CSC, via the internet, mail, in person, etc. An account can be credited and replenished via cash, check, or credit card. Once an account is established, a transponder or tag corresponding to the ETC account is issued to an account holder.

The tag can then be mounted on the windshield, or another accessible area, of a vehicle. This enables readers, which are typically permanently mounted above toll lanes adjacent to toll booth structures, to debit ETC accounts when vehicles pass through a toll lane in a toll plaza. A tag can be read by an antenna that is part of the reader. After reading data from the tag, a local computer checks the tag ID against the list of valid tags, in real time, and if successful, conducts a transaction. When a transaction occurs, a transaction record is stored on the local computer. The local computer can also prompt a response, such as raising a gate or giving a green light, from another part of the system after a successful transaction. In some embodiments, the local computer can include a PDA in the hand of an attendant, and the response can include feedback on the PDA indicating that the customer's RFID tag represents a valid, current account, such that the transaction can be treated as completed and the driver waved through. The attendant can also provide the customer an option for receiving a receipt.

According to some embodiments, a system is provided to collect payment using handheld tag readers. The system can be used to collect parking fees. As an example, reference is made to FIG. 1. The mobile parking system 01 includes a mobile reader system 12 and a mobile data station. The mobile reader system 12 of FIG. 1 includes a radio frequency identification (RFID) tag reader 08 and a personal digital assistant (PDA) 10. The mobile data station includes a local computer 14, such as a laptop, which can be moved in order to setup the mobile parking system 01 in a variety of different locations.

In the illustrated embodiment, the PDA 10 stores a list of valid tags, compares the list against a scanned tag, and creates a toll transaction. The toll transactions are transmitted, typically from a plurality of mobile reader systems 12, to the local computer 14. However, all of the functionalities of the mobile data station (PDA 10 and local computer 14) could alternatively be included on the PDA 10. In addition, all of the functionalities of the reader and the mobile data station could alternatively be integrated into one device.

An entirely mobile system such as this has many advantages. The whole system can easily be moved from event to event, and only requires moving the mobile data station (e.g., PDA 10 and/or laptop computer 14) and handheld tag readers 08. For example, one person could move the system by herself from a concert one night to a baseball game the next day. This not only allows for easy setup and movement, but also allows an owner to maximize use of the system and provides complete flexibility for the configuration and traffic flow into and out of the parking lot.

Typically, parking at large events is slow and frustrating. Customers are often in a hurry (e.g., to catch the beginning of a ballgame) and are forced to wait in long lines where an attendant manually collects payment from each vehicle. Many parking venues only accept cash and it is not unusual for a customer without cash to hold up the line.

The mobile parking system with handheld readers can be setup almost anywhere with minimal effort to make parking a less frustrating experience. With just a tag reader and a PDA the system can be ready to collect parking fees. Then a parking attendant can use a reader to scan a tag associated with a vehicle, and vehicles can efficiently enter the parking venue. This also provides customers with additional convenience by enabling them to pay with ETC accounts. A customer who forgets cash can use his ETC account instead of turning back and disrupting the flow of vehicles into the parking lot. Attendants using readers can also collect manual payment, providing users with additional options to pay in the most convenient fashion. Furthermore, unlike systems employing mounted readers for specific lanes, the entirely mobile system of FIG. 1 has the advantage that cross-lane readings (see description of FIG. 2 below) are not a danger, due to the fact that the range of the wand or handheld tag reader 08 is limited.

The mobile parking system 01 enables a parking attendant 06 to collect payment for parking a vehicle 02 from a customer using an electronic toll payment account, which is typically created by a CSC that is often, but not always, a separate entity from the owner and operator of the system. In the illustrated embodiment, the handheld tag reader 08 is a handheld wand, such as those available commercially from Mark IV Industries, Inc. of Amherst, N.Y. First, the attendant directs the mobile reader 08 toward a tag in the vehicle 02 to be parked, which tag is linked to an ETC account (e.g., Fas-Trak™). Typically this step includes waving the wand 08 over the windshield of the vehicle 02 to be parked, because such tags are typically, but not necessarily, mounted on the windshield or the dash of the vehicle 02. Then the system 01 prompts the mobile reader 08 to communicate (e.g., via RFID communication) with the tag so as to "read" tag information as illustrated by wireless communication link A. This tag information typically includes a tag ID number.

Next, the system sends the tag information to a PDA 10 as illustrated by wireless communication link B. The PDA 10 verifies the validity of the tag by comparing the tag ID to a local list of valid tag IDs, which are typically uploaded to the mobile data station (PDA 10 and/or local computer 14) on a daily basis from a Customer Service Center (CSC) 18. The local list typically includes all valid tags from which the system will accept payment. In one embodiment, the local list is maintained on the parking attendant's PDA. In another embodiment, the local list is maintained on the local computer 14. If the tag is valid (i.e., it has a positive account balance), a transaction record is created and subsequently transmitted to the local computer 14. The transmission can be over a hard link such as a docking station for the PDA 10 at the local computer 14, but is preferably wireless (e.g., via WiFi) as illustrated by wireless communication link C. Alternatively, the transaction record could also be initially created on the local computer 14 in response to reading and verifying the valid tag in the vehicle 02.

If after comparing the scanned tag to the local list of valid IDs tags, the scanned tag is found to be valid, the attendant 06 is given notification, such as a message on the PDA 10, that the transaction has been recorded and the amount of the charge. In response, the attendant 06 can inform the customer that the toll has been charged to the customer's account and wave the customer through. Additionally, the attendant can also provide the customer an option for receiving a receipt with details of the transaction. For example, a portable (e.g., belt-mounted) printer, such as those commonly used by attendants at rental car facilities, can be employed to generate such a receipt.

Local computers 14 are typically configured to communicate with a number of mobile reader systems 12, and thus with a number of handheld readers 08. Periodically, the local computer 14 sends parking transaction data to a central computer 16 via broadband connection as illustrated by communication link D. If a cellular wireless connection is available as shown, the toll transaction can be sent to the central computer 16 in real time, during the event from the parking lot. Alternatively, the local computer 14 can be periodically (e.g., daily) connected by hardwire or WiFi™ connection to the central computer 16 to simultaneously upload toll transaction data and download valid tag ID information. The central computer 16 distributes the parking transaction data to an appropriate CSC 18 via the Internet as illustrated by communication link E. In other configurations, a local computer 14 that is mobile could send the parking transaction data to the CSC 18 directly. Periodically, tag status information is sent from the CSC 18 to the central computer 16 and/or local computer 14 to update local tag data.

Thus, a mobile system 01 is provided for ETC of parking fees. The mobile system 01 contains sufficient infrastructure to charge customers for parking without the need for toll booths or other permanent structures. The mobile system 01 is configured to charge ETC accounts setup by a customer through the CSC 18.

Figure 2:
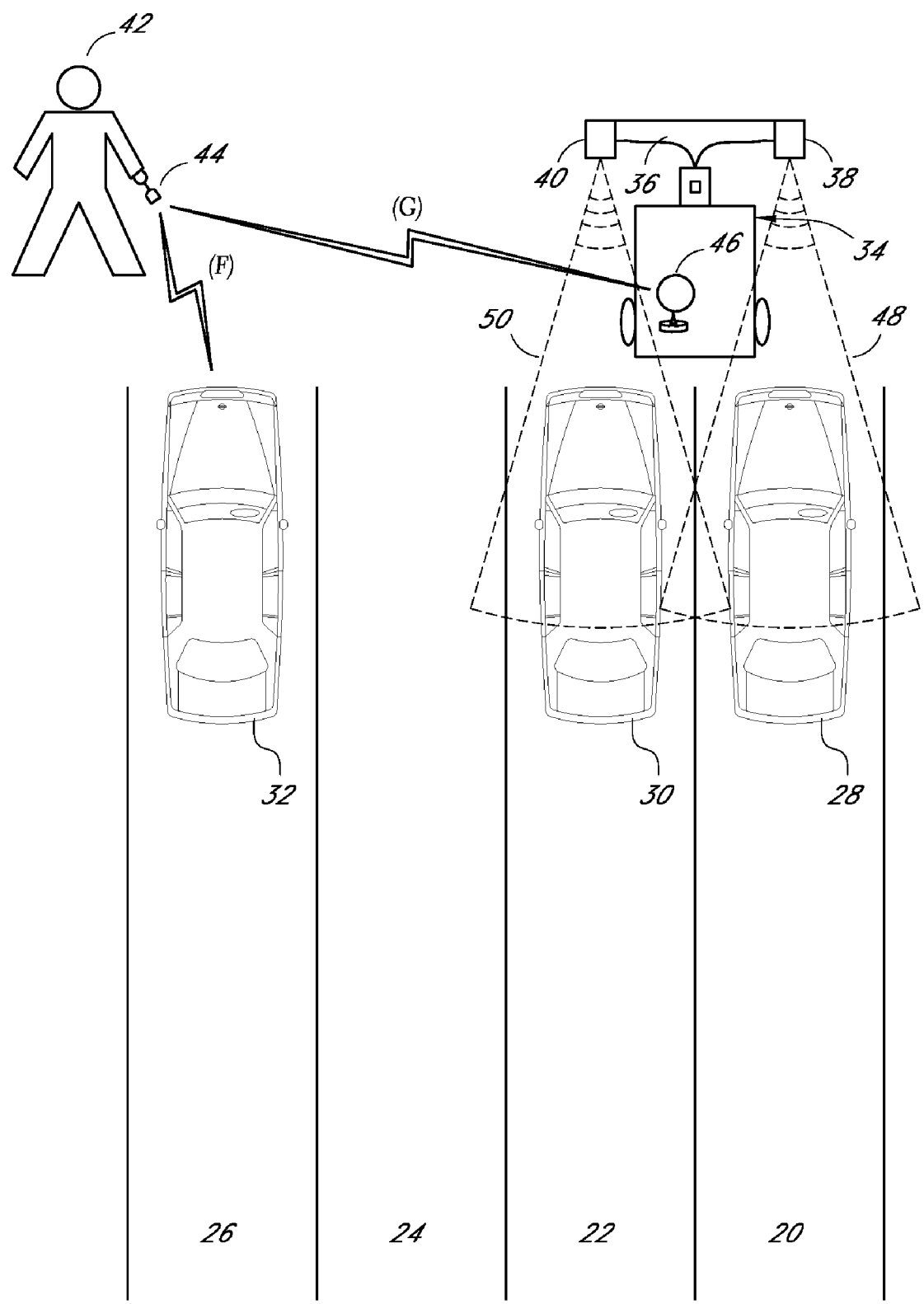
FIG. 2 illustrates another embodiment of a mobile system for collecting parking fees from electronic toll collection accounts using a vehicle with a tag reader mounted thereon for at least one lane, with optional additional handheld units for attendant-manned lanes.

The mobile system of FIG. 2 shows another embodiment, including a vehicle and a boom 36. The vehicle, a trailer 34, is easily moved from location to location, and typically contains wheels and a trailer hitch so that a car or truck can pull the trailer 34 to a new location. A mobile computing center 46, which can comprise a laptop or desktop, is located within the trailer 34.

The boom 36 is attached to the trailer 34 and extends therefrom over a lane 20 in a manner and at a height sufficient to allow most cars and light trucks to pass under (e.g., greater than 6 feet or greater than 7 feet of clearance). In another arrangement, the reader 38 can be mounted on the trailer 34 or a boom 36 to the side of the lane 20, as long as the reader can reach tags on the dash or windshield, or another accessible area, of a vehicle 28 passing through the lane 20. The illustrated boom 36 includes at least one and is shown with two tag readers 38, 40 mounted thereon. The mobile computing center 46 is configured to communicate with the readers 38, 40. Data can be transmitted electrically through wires or wirelessly. For example, in FIG. 2, the readers 38, 40 communicate electrically with the mobile computing center 46, while the handheld reader 44 communicates wirelessly (e.g., through WiFi or Bluetooth). The mobile computing center 46 can additionally control other elements in the mobilized system. For example, the mobile computing center 46 could flash a green light after the user pays a toll, or provide some other indication that the tag in a vehicle passing under the boom 36 has been successfully read and deemed valid, and that the corresponding account has been or will be charged.

Each reader 38, 40 creates a broadcast zone 48, 50 in which the readers 38, 40 scan for tags to read. The readers 38, 40 are positioned to point in the general direction in which vehicles 28, 30 with tags will approach. For example, the reader 38 can be positioned on the boom 36 above a lane 20 where vehicles will pass as illustrated in FIG. 2. In one arrangement, each reader 38, 40 can be configured to charge vehicles in a separate ETC lane. For example, the reader 38 can charge vehicles in lane 20 and the reader 40 can charge vehicles in lane 22.

In a preferred arrangement, however, only vehicles in one of the lanes, e.g., lane 20, are charged when read by the reader 38. However, because the mounted reader 38 should have a reasonable range for reading tags in vehicles, the problem of cross-lane readings arises. In particular, a reader 38 could read a tag on a vehicle 30 in an adjacent lane 22 when the vehicle 30 enters the broadcast zone 48. The adjacent lane 22 is not, in this arrangement, intended for ETC, but a car 30 might have a tag that could be read due to the proximity of lanes 20, 22. However, this tag should not be read. In order to solve this problem, the mobile computing center 46 is configured to process information from the plurality of readers 38, 40. For example, if lane 20 is configured for ETC and lane 22 is not, the mobile computing center 46 can prevent reader 38 from conducting a transaction with a tag on vehicle 30. One way this could be accomplished is by comparing the stronger signal intensity from reader 40 and the weaker signal intensity from reader 38 to determine that vehicle 30 is in lane 22 and therefore should not be charged by reader 38.

Additionally, a parking attendant 42 could use a handheld mobile reader system 44, which could be substantially similar to the mobile reader system 12 of FIG. 1, including a wireless handheld reader 08 and PDA 10, in conjunction with the mobile system for ETC. The handheld mobile reader system 44 also communicates wirelessly with the mobile computing center 46. As noted above, the use of the handheld reader or wand 08 advantageously avoids the problem of cross-lane readings, due to the limited range of the wand 08.

The systems and associated methods described and illustrated herein are not limited to the exact descriptions provided. Nor are they necessarily limited to the practice of all elements disclosed.

Furthermore, the skilled artisan will recognize the interchangeability of various features from different embodiments. Similarly, the various features and steps discussed above, as well as other known equivalents for each such feature or step, can be mixed and matched by one of ordinary skill in this art to perform methods in accordance with principles described herein.

Although this invention has been disclosed in the context of certain embodiments and examples, it will be understood by those skilled in the art that the present invention extends beyond the specifically disclosed embodiments to other alternative embodiments and/or uses of the invention and obvious modification thereof. Thus, it is intended that the scope of the present invention herein disclosed should not be limited by the particular disclosed embodiments described above, but should be determined only by a fair reading of the claims that follow.

We claim:

1. A method for collecting tolls for a parking venue, the method comprising:
   providing a mobile system for wirelessly receiving and processing electronic account information;
   positioning the mobile system at an entrance or exit to the parking venue;
   using the mobile system to wirelessly receive electronic account information associated with an electronic device in a vehicle at the entrance or exit; and
   conducting a transaction to charge a toll to the account associated with the electronic account information.

2. The method of claim 1, wherein conducting the transaction comprises:
   using the mobile system to identify the account associated with the electronic account information;
   using the mobile system to verify ability to charge the account; and
   charging a fee from the account after using the mobile system to verify.

3. The method of claim 2, wherein the mobile system further comprises a computer storing a list of valid accounts, and wherein using the mobile system to verify comprises comparing the electronic account information to the list of valid accounts.

4. The method of claim 3, wherein the computer comprises a laptop.

5. The method of claim 3, wherein the computer comprises a personal digital assistant (PDA).

6. The method of claim 1, wherein using the mobile system to wirelessly receive comprises wirelessly requesting and receiving data from the electronic device.

7. The method of claim 6, wherein the data from the electronic device comprises electronic tag data.

8. The method of claim 1, further comprising sending transaction data to a central computer in real time following the conducting a transaction.

9. The method of claim 1, further comprising sending transaction data to a customer service center (CSC), wherein the CSC maintains the accounts.

10. The method of claim 1, wherein using the mobile system to wirelessly receive comprises utilizing a handheld scan device.

11. The method of claim 1, wherein the electronic device comprises an RF transponder.

12. The method of claim 1, wherein the mobile system comprises a parking system vehicle with a boom attached.

13. The method of claim 12, wherein the boom is configured to extend laterally from the parking system vehicle over a lane at a height sufficient to allow for vehicles to pass under.

14. The method of claim 1, wherein wirelessly receiving comprises receiving electronic account information from multiple vehicles entering or exiting the parking venue through multiple vehicle lanes.

15. The method of claim 1, further comprising raising a gate after conducting the transaction.

16. The method of claim 1, further comprising displaying a green light after conducting the transaction.

17. The method of claim 1, wherein using the mobile system to wirelessly receive comprises providing an attendant with a handheld wand for waving over the electronic device.

18. A mobile scan apparatus comprising:
- a plurality of wireless readers each capable of wirelessly receiving electronic account information from a plurality of electronic devices in order to collect payment from vehicles entering or exiting a parking venue through multiple vehicle lanes, wherein each wireless reader is directed to a different one of the lanes; and
- a computer in communication with the wireless readers, the computer configured to conduct a transaction to charge a toll to the account associated with the electronic account information.

19. The mobile scan apparatus of claim 18, wherein one of the wireless readers comprises a boom.

20. The mobile scan apparatus of claim 18, wherein one of the wireless readers comprises a handheld scan device.

21. The mobile scan apparatus of claim 18, wherein the computer comprises a laptop.

22. The mobile scan apparatus of claim 18, wherein the computer comprises a personal digital assistant (PDA).

23. A mobile scan apparatus comprising:
- a toll collection vehicle;
- a boom attached to the tool collection vehicle, the boom configured to extend laterally from the toll collection vehicle over a lane at a height sufficient to allow for vehicles to pass under, the boom comprising a wireless reader capable of wirelessly receiving electronic account information from a plurality of electronic devices; and
- a computer in communication with the reader, the computer configured to conduct a transaction to charge a toll to the account associated with the electronic account information.

24. The mobile scan apparatus of claim 23, wherein the computer comprises a laptop.

25. The mobile scan apparatus of claim 23, wherein the computer comprises a personal digital assistant (PDA).

26. The mobile scan apparatus of claim 23, further comprising a handheld scan device capable of communication with the computer, the handheld scan device configured to wirelessly communicate with the plurality of electronic devices.

* * * * *